United States Patent [19]

Woodle

[11] Patent Number: 5,199,518
[45] Date of Patent: Apr. 6, 1993

[54] LOAD CELL

[76] Inventor: Sheldon Woodle, 16870 NE. 24th Pl., Bellevue, Wash. 98008-2323

[21] Appl. No.: 838,480

[22] Filed: Feb. 19, 1992

[51] Int. Cl.⁵ .......................... G01G 3/14; G01L 1/22
[52] U.S. Cl. .................................. 177/211; 73/862.627; 338/2
[58] Field of Search .................. 177/211; 73/862.627, 73/862, 629; 338/2-6

[56] References Cited

U.S. PATENT DOCUMENTS

| | | |
|---|---|---|
| 2,759,356 | 8/1956 | Blackmon . |
| 2,920,880 | 1/1960 | Laycock . |
| 3,241,626 | 3/1966 | Woodburn . |
| 3,602,866 | 8/1971 | Saxl . |
| 3,603,418 | 9/1971 | Schmidt . |
| 3,878,908 | 4/1975 | Andersson . |
| 3,949,603 | 4/1976 | Laimins . |
| 4,020,911 | 5/1977 | English . |
| 4,042,049 | 8/1977 | Reichow . |
| 4,095,659 | 6/1978 | Blench . |
| 4,241,801 | 12/1980 | Kushmuk . |
| 4,249,623 | 2/1981 | McCauley . |
| 4,362,218 | 12/1982 | Shoberg . |
| 4,453,607 | 6/1984 | Zink . |
| 4,516,646 | 5/1985 | Bergfalk . |
| 4,549,439 | 10/1985 | Keen et al. ...................... 73/862.627 |
| 4,666,003 | 5/1987 | Reichow ......................... 177/211 X |
| 4,694,921 | 9/1987 | Johnston . |
| 4,702,329 | 10/1987 | Click . |
| 4,744,254 | 5/1988 | Barten . |
| 4,775,018 | 10/1988 | Kroll ............................. 177/211 X |
| 4,789,035 | 12/1988 | Hamilton . |
| 4,838,372 | 6/1989 | Krause . |
| 4,858,710 | 8/1989 | Krause . |
| 4,892,163 | 1/1990 | Aumard . |
| 4,921,059 | 5/1990 | Woodle . |
| 4,957,177 | 9/1990 | Hamilton . |
| 4,979,581 | 12/1990 | Kroll ................................. 177/211 |

Primary Examiner—George H. Miller, Jr.
Attorney, Agent, or Firm—Graybeal Jackson Haley & Johnson

[57] ABSTRACT

A load cell includes a deformable member having a chamber therein extending parallel to the direction of force. A plate on the deformable member extends transversely to the direction of force and to the axis of the chamber. The plate is welded to the deformable member such that it covers the chamber. The plate and welding carry the structural loads of the deformable member. Strain gauges are positioned on the interior sides of the chamber.

15 Claims, 3 Drawing Sheets

LOAD CELL

BACKGROUND OF THE INVENTION

The present invention pertains to strain gauge load cells, and, more particularly to single-ended or double-ended shear beam load cells having welded structural components which increase resistance to overload or side load forces.

Load cell weighing systems, and, in particular, weighing systems for vehicles such as logging trucks and bulk haulers, typically use a plurality of load cell assemblies to monitor the weight added to the trucks and trailers. Load cell assemblies usually include a machined steel block that is supported between load-carrying members, such as log supports, a bulk container or a tank, and mounting members, such as a truck or trailer frame. These steel blocks ar configured to direct the load to predetermined areas, where the load induced stresses are measured using strain gauges. These load cells are divided into two types, those which measure bending beam stresses and those which measure the shear stresses in the beam.

Bending beam load cells known in the art have inherent problems in safety and operation as detailed in U.S. Pat. No. 4,666,003 issued to Reichow, which is incorporated herein by reference. An additional problem is the non-linearity which occurs from even slight misalignment of the strain gauges for the bending beam load cells.

Weighing systems using the shear beam load cells have typically been manufactured by machining a hole partially through the side of a solid beam in transverse directions, leaving a web in the middle of the beam. The strain gauges are then placed on the center of the web. The resulting structure resembles an I-beam in cross-section, and resists forces directed downwardly. However, this load cell configuration is weak when side forces are applied, especially off-center side forces. The resulting twisting of the load cell results in reduced safe side load operation.

All of the prior art load cells avoid the use of structural welding in areas through which forces are directed for strain gauge measurement. U.S. Pat. No. 4,020,911 issued to English, et al. shows structural welding, but only in the heavy beam areas which serve as rigid mounting for the load cell.

Delicate strain gauges and wiring require protection from damage which occur when service technicians clean load cells by scraping mud and dirt and chipping ice therefrom. Welded plates would be an attractive solution to this type of strain gauge damage but for the fact that the prior art teaches away from welding cover plates in the area of the load cell where the strain gauges are located. Thus, the prior art and techniques include the use of chemical sealing compounds which are easily breached.

Where cover plates have been employed in the prior art, they have been non-structural supporting elements. U.S. Pat. Nos. 4,838,372 and 4,858,710 use welding to fasten and seal nonsupporting cover plates. However, the load is carried by the machined load cell block. These two patents limit the type of welding which can be used to precision welds such as microplasma welding, laser welding or electron beam welding, Thus, the welding is meant to seal and fasten the parts together, but is not intended to carry more than a very small portion of the applied load. More specifically, the configuration of these two prior art load cells has been dictated by the necessity of avoiding the welding of cover plates in an area of the load cell which bears the structural load. Specifically, U.S. Pat. No. 4,838,372 and U.S. Pat. No. 4,858,710 both disclose load cells which have an aperture 2 (i.e. a through hole) with welded supports 3 and 6 (i.e. cover plates) thereon. The aperture 2 (through hole) is not parallel with the direction of applied force, but is instead oriented perpendicular thereto to avoid loading of this area. Also, welded supports 3 and 6 are oriented in planes parallel with, not perpendicular to, the direction of the applied force so that these welds and supports do not bear the structural load.

U.S. Pat. No. 3,602,866 teaches a load cell which measures bending tensile stresses in the top and bottom of the beam, as opposed to shear beam load cells. A force transducer has a beam 10 with a hole 16 (i.e. a through hole) formed therein. Strain gauges 22 and 24 are bonded to the opposite sides of hole 16. Holding plate 37 is fixedly secured over the hole 16 to enclose the strain gauge elements 22 and 24 without interfering with the flexural qualities of the beam 10. In order to avoid loading of the holding plate, the through hole is oriented perpendicular to, not parallel with, the applied force; and the holding plate is oriented in a plane parallel with, not perpendicular to, the direction of applied force.

A need thus exists for a load cell in which the welding, or other means for securing the chamber cover plate to the load cell, carries the structural loads of the load cell; thus providing increased resistance to overload and side load forces, and to bending and twisting of the load cell.

A need exists for the above type of load cell in which the welds are in an area of low shear stress so that the effect of the welding on the measured strain is minimized.

A need exists for the above type of load cell where the chamber cover plate also carries the structural load of the load cell.

A need exists for the type of load cell herein described in which the chamber cover plate is structurally welded onto the load cell in an orientation whereby the chamber cover plate extends transversely to the direction of the applied force and to the axis of the chamber so that the chamber cover plate and structural welds carry the structural loads of the load cell.

SUMMARY OF THE INVENTION

In the preferred embodiment of the present invention a load cell includes an elongate deformable member having a top surface and a bottom surface. The deformable member includes a chamber therein which extends parallel to the direction of applied force. This chamber extends through both the top surface and the bottom surface of the elongate deformable member and has a rectangular cross-section. The elongate deformable member also includes a beam on each side of the chamber. Each of the beams has a predetermined height and a width so that uniform stress is present in each of the beams upon loading of the elongate deformable member. A plate is welded onto each of the top surface and the bottom surface of the elongate deformable member to cover the chamber. These plates extend transversely to the direction of force and to the axis of the chamber. The plates and the welding carry the structural loads of the elongate deformable member. Strain gauges are located on opposite interior sides of the chamber (on the beams straddling the chamber) in order to measure shear forces. A strain gauge wire conduit channel extends longitudinally in the elongate deformable member and communicates with the chamber for passage of strain gauge wires therethrough.

While the chamber extends through both the top and bottom surface of the elongate deformable member, the chamber may also only pass through one or the other of the top surface and bottom surface of the elongate deformable member. Additionally, instead of having a rectangular cross-section, the cross-section of the chamber may be square, oval, circular, or any other desired shape which permits functioning of the load cell. A single chamber is located in the elongate deformable member, however a pair or more of chambers may be instead oriented substantially along the longitudinal access of the elongate deformable member to embody what is known as a double-ended load cell.

The plate is preferably attached to the elongate deformable member by welding; however, soldering, brazing, bolting, screwing or riveting may also be employed; provided the fastening means is sufficient to carry the structural loading.

BRIEF DESCRIPTION OF THE DRAWINGS

These and other features of the present invention will be evident when considered in light of the following specification and drawings in which.

DETAILED DESCRIPTION OF THE PREFERRED EMBODIMENTS

Figure 1:
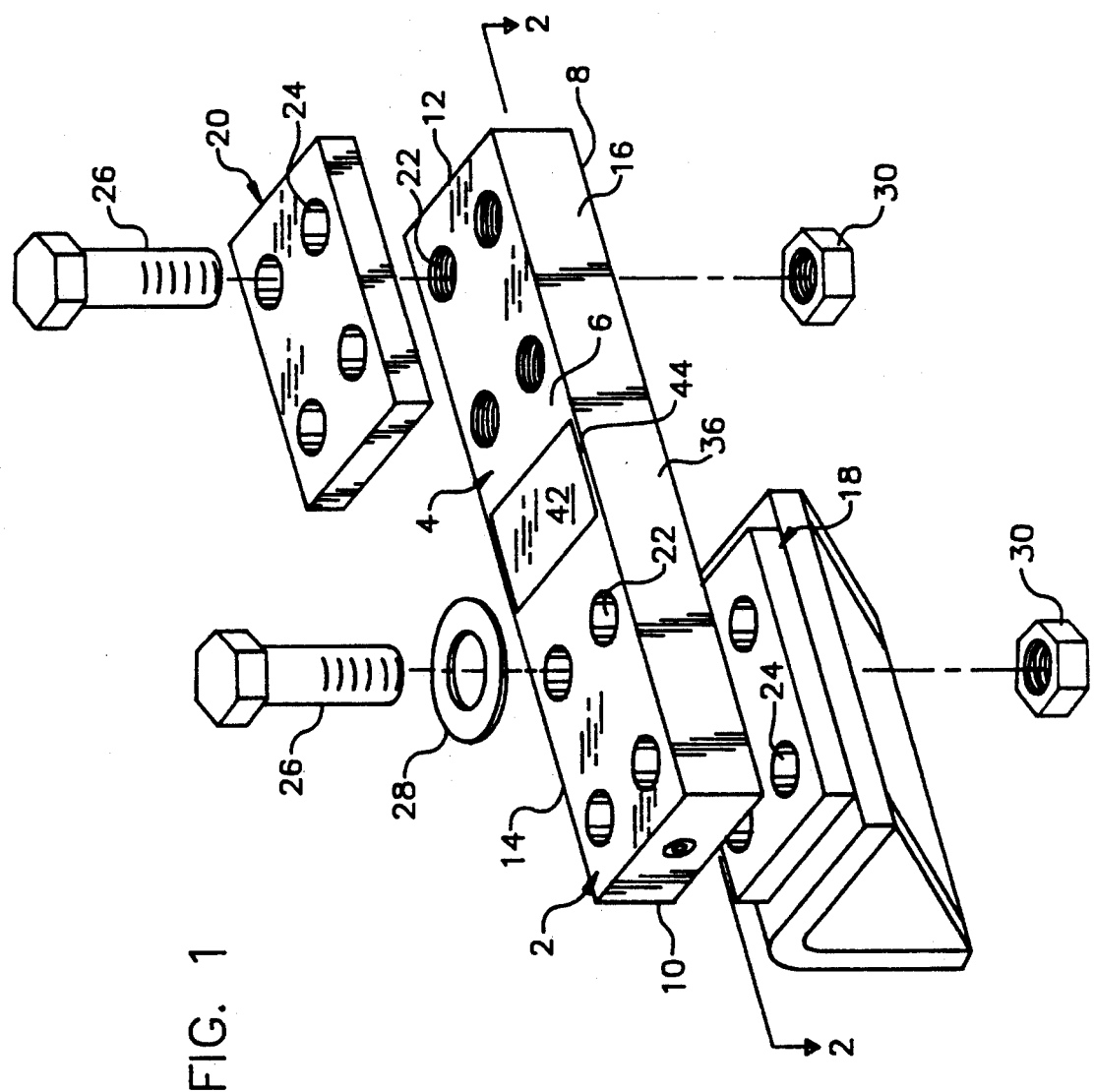
FIG. 1 is an isometric view of a first embodiment of the load cell of the present invention.
Figure 2:
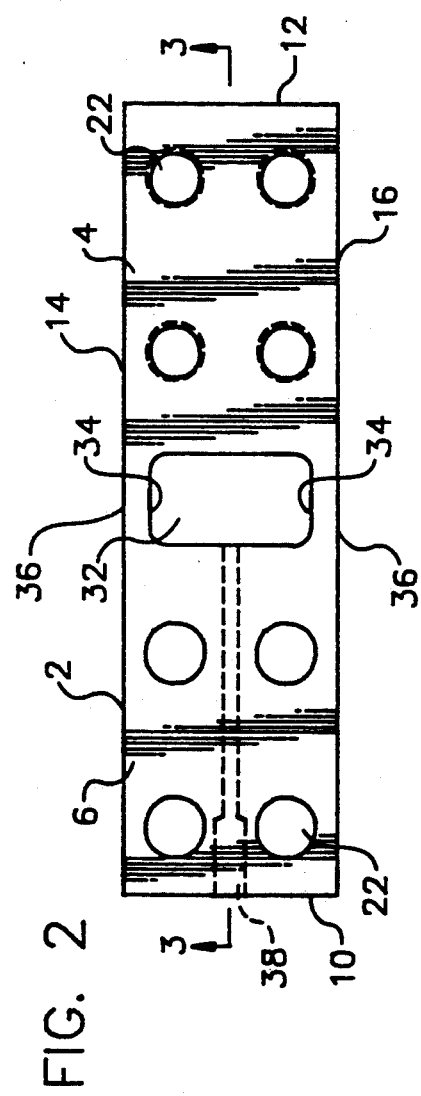
FIG. 2 is a cross-sectional view of the first embodiment of the present invention taken at lines 2—2 of FIG. 1.
Figure 3:
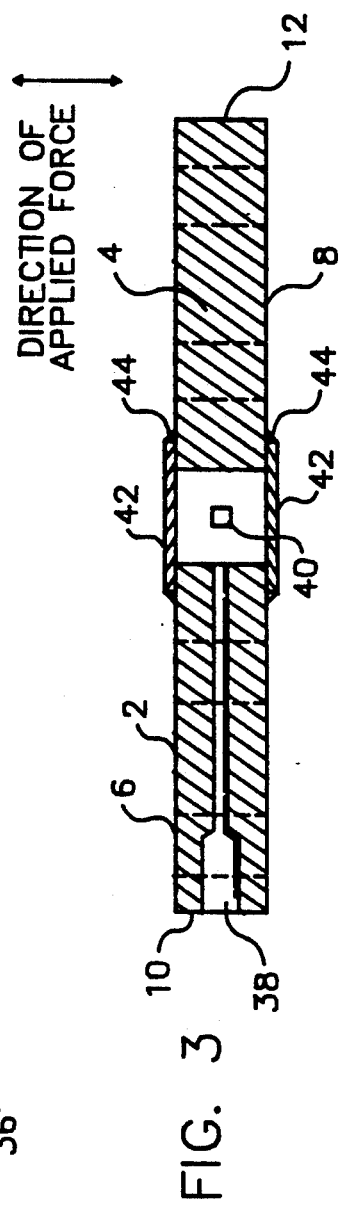
FIG. 3 is a cross-sectional view of the first embodiment of the load cell of the present invention taken at lines 3—3 of FIG. 2.

Referring to FIGS. 1 through 3, a first embodiment of the present invention is disclosed in which load cell 2 includes elongate deformable member 4. Elongate deformable member 4 is preferably comprised of steel or other metal having flexural properties generally known in the art. Elongate deformable member 4 includes top surface 6, bottom surface 8, ends 10 and 12 and sides 14 and 16. Elongate deformable member 4 is adapted to be secured between a base support 18 and a load receiving member 20. More specifically, one or more of through holes 22 are drilled through elongate deformable member 4, adjacent end 10 and end 12. Through holes 24 are drilled in both base support 18 and load receiving member 20 such that through holes 24 are in alignment with through holes 22 on elongate deformable member 4. Bolts 26 are passed through holes 22 in end 10 of elongate deformable member 4 and through holes 24 in base support 18; as well as through holes 22 in end 12 of elongate deformable member 4 and through holes 24 in load receiving member 20. Bolts 26 are fastened with washer 28 and nut 30. Other methods of mounting elongate deformable member 4 to base support 18 and load receiving member 20 may be employed, such as, for example, by means of welding, brazing, or by threading bolts 26 into through holes 22 and 24.

Chamber 32 is formed in elongate deformable member 4 such that chamber 32 extends therethrough in a direction parallel to the direction of force applied on load cell 2 from load receiving member 20. Chamber 32 includes opposite interior sides 34 which each define a beam member 36 of elongate deformable member 4. Each of the two beam members 36 thus extends longitudinally on elongate deformable member 4. Loads passing downwardly through load receiving member 20 are thus directed through beam members 36 to base support 18. Chamber 32 is preferably precisely machined such that beam members 36 have a predetermined height and width in order that uniform stress is present in each of beam members 36 upon loading of elongate deformable member 4 from the load passed from load receiving member 20.

Chamber 32 is preferably substantially rectangular in cross-section, but may also be, for example, square, oval or circular in cross-section, or of any other desired cross-section which facilitates the unique cover plate and associated structural welding configuration of the subject invention. Strain gauge wire conduit 38 preferably extends longitudinally in elongate deformable member 4 and communicates with chamber 32 such that wires from strain gauges 40 can be connected in a wheat stone bridge configuration (not shown) which is well known in the art. The wheat stone bridge is connected to a display or other weight processing device, remotely located from elongate deformable member 4. Preferably, a strain gauge 40 is secured to each beam member 36 on interior sides 34 of chamber 32 in such a manner that load applied to load receiving member 20 results in an electrical output proportional to this load as beam members 36 are deformed. Strain gauges 40 are oriented on beam members 36 (i.e. at the location of interior sides 34 of chamber 32) such that unwanted sides forces or twisting forces are cancelled. Strain gauges 40 may be load cell strain gauges well known in the art.

An important aspect of the subject invention is the orientation of chamber cover plate 42, and of the means for structurally securing chamber cover plate 42 to elongate deformable member 4. More specifically, two chamber cover plates 42 are present in the first embodiment of the subject invention because chamber 34 extends through both top surface 6 and bottom surface 8 of elongate deformable member 4. Chamber cover plates 42 are sized to fit over chamber 32, and extend transversely to the direction of applied force on load receiving member 20. Additionally, chamber cover plates 42 extend transversely to the axis of chamber 32 which, as stated above, extends parallel to the direction of applied force. Chamber cover plates 42 are preferably structurally secured to elongate deformable member 4 over chamber 32 by means of structural welding 44. However, the scope of the present invention encompasses other means of structurally securing chamber cover plates 42 to elongate deformable member 4, such as, for example, soldering, brazing, bolting, screwing, riveting, or adhesive bonding, or any other means of structural attachment; as long as this means of structural attachment, along with chamber cover plates 42, carry the structural loads of deformable member 4, increase resistance to overload and side load forces by elongate deformable member 4 and/or resist bending and twisting of elongate deformable member 4. Welding 44 is preferably located in an area of low shear stress so that the effect of welding 44 on measured strain is minimized. Chamber cover plates may be secured on top of top surface 6 (and bottom surface 8) of elongate deformable member 4, or may fit flushly with top surface 6 (and bottom surface 8).

Figure 4:
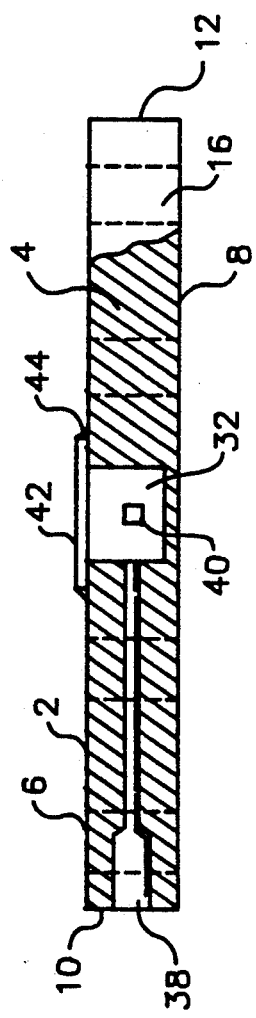
FIG. 4 is a partially exposed side view of a second embodiment of the load cell of the present invention.

As shown in FIG. 4, the second embodiment of the present invention contemplates a load cell identical to the load cell of the first embodiment of the present invention but for the presence of a single chamber cover plate 42. As the second embodiment of FIG. 4 includes the same elements as the first embodiment of FIGS. 1–3, like numerals are employed to describe like elements. A single cover plate 42 is employed in the second embodiment of the present invention because chamber 32 only extends through top surface 6 of elongate deformable member and not bottom surface 8. It is readily apparent that the second embodiment present invention also contemplates a load cell 2 in which chamber 32 extends through bottom surface 8, but not top surface 6, of elongate deformable member 4.

Figure 5:
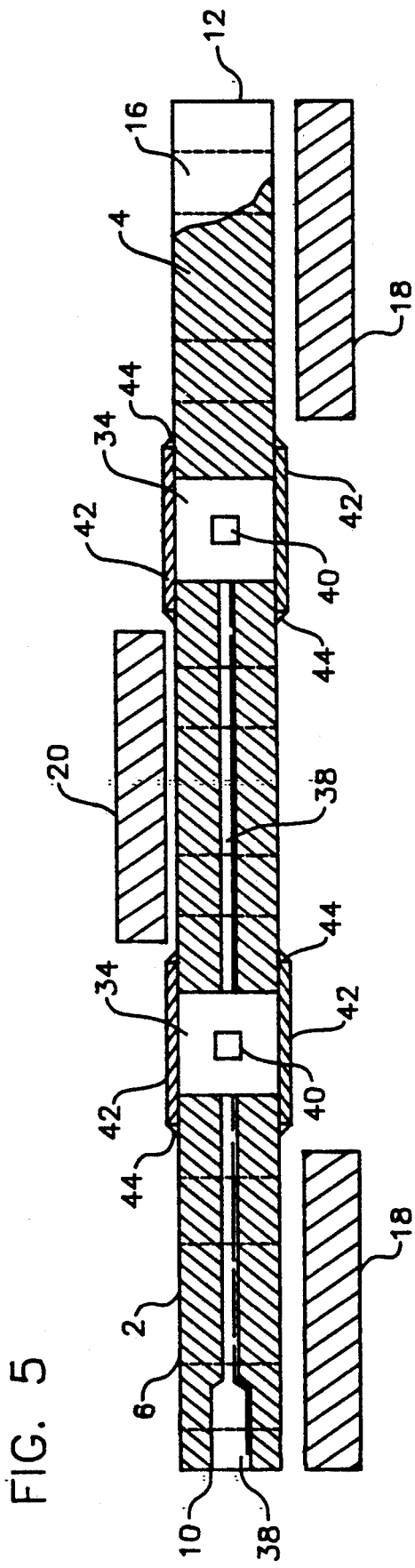
FIG. 5 is a partially exposed side view of a third embodiment of the load cell of he present invention.

Now referring to FIG. 5, a third embodiment of the present invention is shown. This third embodiment of the present invention discloses what is known in the art as a "double-ended" load cell as opposed to the "single-ended" load cell disclosed in the first and second embodiments of the present invention. As the third embodiment of FIG. 5 includes the same elements as disclosed in the first and second embodiments above, like numerals are employed to describe like elements. The elongate deformable member 4 of load cell 2 of the third embodiment is identical to that of the first and second embodiment of the present invention with the following exceptions. Instead of a single chamber 32, in the third embodiment of the present invention two chambers 32 are located in elongate deformable member 4, preferably oriented substantially along the longitudinal axis thereof. Each chamber 32 includes a pair of strain gauges 40, with each strain gauge 40 secured to an interior side 34 of a chamber 32 (i.e. on a beam member 36). The strain gauge wire conduit 38 disposed within elongate deformable member 4 communicates with both of chambers 32 for passage of strain gauge wire from chambers 32 in a wheat stone bridge configuration (not shown) connected to a scale display. Each of chambers 32 extend parallel to the direction of the applied force on load cell 2 from load receiving member 20. Each of chambers 32 extends through at least one of top surface 6 or bottom surface 8 of elongate deformable member 4, and one or both of chambers 32 may extend through both top surface 6 and bottom surface 8. Chamber cover plates 42 are present over chambers 32 at all locations where a chamber 32 extends through top surface 6 or bottom surface 8 of elongate deformable member 4. Chamber cover plates 42 extend transversely to both the direction of the applied force and the axis of chambers 32. Welding 44, or other means for structurally securing chamber cover plates 42 over chambers 34 of elongate deformable member 4, is employed in the same manner as in the first and second embodiments of the present invention to increase resistance to overload or side load forces by elongate deformable member 4, resist bending and twisting of load cell 2, and carry the structural load of elongate deformable member 4. Load receiving member 20 is fixedly secured in a manner described above in substantially the center of elongate deformable member 4 and between the two chambers 32. Two base supports 18 are employed in the third embodiment of the present invention, one base support 18 located adjacent to end 10 of elongate deformable member 4 and the other base support 18 located adjacent to end 12 of elongate deformable member 4. Thus, loads are directed downwardly through load receiving member 20 between the two chambers 32, as well as between the two base supports 18, such that these loads deform the four beam members 36 defined by the interior sides 34 of each of the two chambers 32.

The above described embodiments are intended to be descriptive, not restrictive. The full scope of the invention is described by the claims, and any and all equivalents are included.

I claim:

1. A load cell comprising:
    a deformable member having a chamber therein extending parallel to the direction of force, said chamber having opposite interior sides parallel to the direction of force;
    plate means on said deformable member extending transversely to the direction of force and to the axis of said chamber, said plate means covering said chamber;
    means for securing said plate means to said deformable member whereby said plate means and said means for securing said plate means carry the structural loads of said deformable member; and
    strain gauges on said opposite interior sides of said chamber.

2. The load cell of claim 1 wherein said deformable member has a top surface and a bottom surface, said chamber extends through both said top surface and said bottom surface, and said plate means is on each of said top surface and said bottom surface to cover said chamber.

3. The load cell of claim 1 wherein said deformable member has a top surface and a bottom surface, and said chamber extends only through one of said top surface and said bottom surface.

4. The load cell of claim 1 wherein said means for securing said plate means is comprised of at least one of welding, soldering, brazing, bolting, adhesive bonding, screwing, or riveting said plate means to said deformable member.

5. The load cell of claim 1 wherein said chamber is rectangular, square, circular, hexagonal or oval in cross-section.

6. The load cell of claim 1 wherein said deformable member includes a strain gauge wiring conduit, said strain gauge wiring conduit communicating with said chamber.

7. The load cell of claim 1 wherein said deformable member includes a beam member on each of said opposite interior sides of said chamber, each of said beam members having a predetermined width and height so that uniform stress is present in each of said beam members upon loading of said deformable member.

8. A load cell comprising:
    an elongate deformable member having a top surface and a bottom surface, said deformable member having a chamber therein extending parallel to the direction of force, said chamber extending through both said top surface and said bottom surface, said chamber having opposite interior sides extending parallel to the direction of force and having a rectangular cross-section, said elongate deformable member having a beam member on each of said opposite interior sides of said chamber, each of said beam members having a predetermined height and width so that uniform stress is present in each of said beam members upon loading of said elongate deformable member;

plates welded onto each of said top surface and said bottom surface of said elongate deformable member, said plates extending transversely to the direction of force and to the axis of said chamber, said plates covering said chamber whereby said plates and said welding carry the structural loads of said elongate deformable member;

strain gauges on said opposite interior sides of said chamber; and a strain gauge wire conduit channel extending longitudinally in said elongate deformable member and communicating with said chamber.

9. A load cell comprising:

a deformable member having a pair of chambers therein oriented substantially along the longitudinal axis of said deformable member, said chambers extending parallel to the direction of force, said chambers each having opposite interior sides extending parallel to the direction of force;

plate means on said deformable member extending transversely to the direction of force and to the axis of said chambers, said plate means covering each of said chambers;

means for securing said plate means to said deformable member whereby said plate means and said means for securing said plate means carry the structural loads of said deformable member; and strain gauges on said opposite interior sides of each of said chambers.

10. The load cell of claim 9 wherein said deformable member has a top surface and a bottom surface, each of said chambers extends through both said top surface and said bottom surface, and said plate means is on said top surface and said bottom surface to cover each of said chambers.

11. The load cell of claim 9 wherein said deformable member has a top surface and a bottom surface, and each of said chambers extends only through one of said top surface and said bottom surface.

12. The load cell of claim 9 wherein said means for securing said plate means is comprised of at least one of welding, soldering, brazing, bolting, adhesive bonding, screwing or riveting said plate means to said deformable member.

13. The load cell of claim 9 wherein said chambers are rectangular, square, circular, hexagonal or oval in cross-section.

14. The load cell of claim 9 wherein said deformable member includes a strain gauge wiring conduit therein, said strain gauge wiring conduit communicating with each of said chambers.

15. The load cell of claim 9 wherein said deformable member includes a beam member on each of said opposite interior sides of each of said chambers, each of said beam members having a predetermined width and height so that uniform stress is present in each of said beam members upon loading of said deformable member.

* * * * *